(12) United States Patent
Deroo et al.

(10) Patent No.: US 12,330,632 B2
(45) Date of Patent: Jun. 17, 2025

(54) METHOD, COMPUTER-IMPLEMENTED TOOL, VEHICLE CONTROL UNIT, AND VEHICLE FOR LOCATING OBSTACLES IN VEHICLE ROADWAY REGIONS, WHICH ARE CHARACTERIZED BY LANDMARKS

(71) Applicant: Siemens Mobility GmbH, Bayern (DE)

(72) Inventors: Frederik Deroo, Hallbergmoos (DE); Kristian Weiss, Berlin (DE)

(73) Assignee: Siemens Mobility GmbH, Bayern (DE)

( * ) Notice: Subject to any disclaimer, the term of this patent is extended or adjusted under 35 U.S.C. 154(b) by 193 days.

(21) Appl. No.: 18/017,972

(22) PCT Filed: Jul. 15, 2021

(86) PCT No.: PCT/EP2021/069758
§ 371 (c)(1),
(2) Date: Jan. 25, 2023

(87) PCT Pub. No.: WO2022/028848
PCT Pub. Date: Feb. 10, 2022

(65) Prior Publication Data
US 2023/0264688 A1    Aug. 24, 2023

(30) Foreign Application Priority Data

Aug. 7, 2020    (DE) .................... 10 2020 210 059.4

(51) Int. Cl.
*B60W 30/08*  (2012.01)
*B60W 40/06*  (2012.01)
*G06V 20/56*  (2022.01)

(52) U.S. Cl.
CPC ............ *B60W 30/08* (2013.01); *B60W 40/06* (2013.01); *G06V 20/588* (2022.01); *B60W 2420/403* (2013.01)

(58) Field of Classification Search
CPC ..................................................... B60W 30/08
See application file for complete search history.

(56) References Cited

U.S. PATENT DOCUMENTS 7,650,239 B2 * 1/2010 Samukawa ........... G01S 17/931
356/28
8,612,150 B2 * 12/2013 Heger ..................... G01S 11/12
701/532

(Continued)

FOREIGN PATENT DOCUMENTS

DE    102008007347 A1    8/2009
DE    102016015405 A1    7/2017

OTHER PUBLICATIONS

Albrecht C. et al: "A Concept for an Automated Approach of Public Transport Vehicles To a Bus Stop"; the International Archives of the Photogrammetry, Remote Sensing and Spatial Information Sciences; vol. XLII -2/W16, Sep. 18, 2019 (Sep. 18, 2019), pp. 13-20, XP055852881.

(Continued)

*Primary Examiner* — Michael A Berns
(74) *Attorney, Agent, or Firm* — Schmeiser, Olsen & Watts LLP

(57) ABSTRACT

The disclosed locates obstacles in vehicle roadway regions, without needing to precisely locate the obstacles or landmarks. By associating sensor measurement data, which is detected by a vehicle sensor system and belongs to sensor measurement objects and by obstacles or landmarks can be represented, with stored landmark data; and ascertaining a sensor detection-specific locating distance between a sensor measurement object based on associated and unassociated sensor measurement data in that pieces of sensor detection-specific information contained in the sensor measurement data relating to the locating distance to be ascertained are put into a relationship with one another, an obstacle in a vehicle (Continued)

roadway region, is located is determined on a roadway region constituting an obstacle to the vehicle if the sensor measurement object with unassociated sensor measurement data on the roadway can be correlated at least on the basis of the sensor detection-specific locating distance.

23 Claims, 2 Drawing Sheets

(56) References Cited

U.S. PATENT DOCUMENTS

| | | | | |
|---|---|---|---|---|
| 8,798,841 | B1* | 8/2014 | Nickolaou | B62D 15/0265 |
| | | | | 701/28 |
| 10,830,874 | B2* | 11/2020 | Ioffe | G01S 13/42 |
| 10,876,842 | B2* | 12/2020 | Mielenz | G05D 1/0246 |
| 11,433,880 | B2* | 9/2022 | Sakano | G01C 21/30 |
| 11,584,362 | B2* | 2/2023 | Max | B60W 30/0953 |
| 11,904,939 | B2* | 2/2024 | Jang | B60W 60/0025 |
| 2011/0046882 | A1 | 2/2011 | Heger et al. | |
| 2023/0264688 | A1* | 8/2023 | Deroo | G06V 20/588 |
| | | | | 701/301 |

OTHER PUBLICATIONS

"Scale Invariant Feature Transform <SIFT>" features, cf. Wikipedia. URL: https://en.wikipedia.org/wiki/Scale-Invariant_feature_transform; Date Accessed: Aug. 12, 2020.

"Nvidia Drive Perception" NVIDIA Developer. URL: https://developer.nvidia.com/drive/drive-perception; Date Accessed: Aug. 12, 2020.

PCT International Search Report and Written Opinion of the International Searching Authority mailed 15.11.2021 corresponding to PCT International Application No. PCT/EP2021/069758 filed Jul. 15, 2021.

* cited by examiner

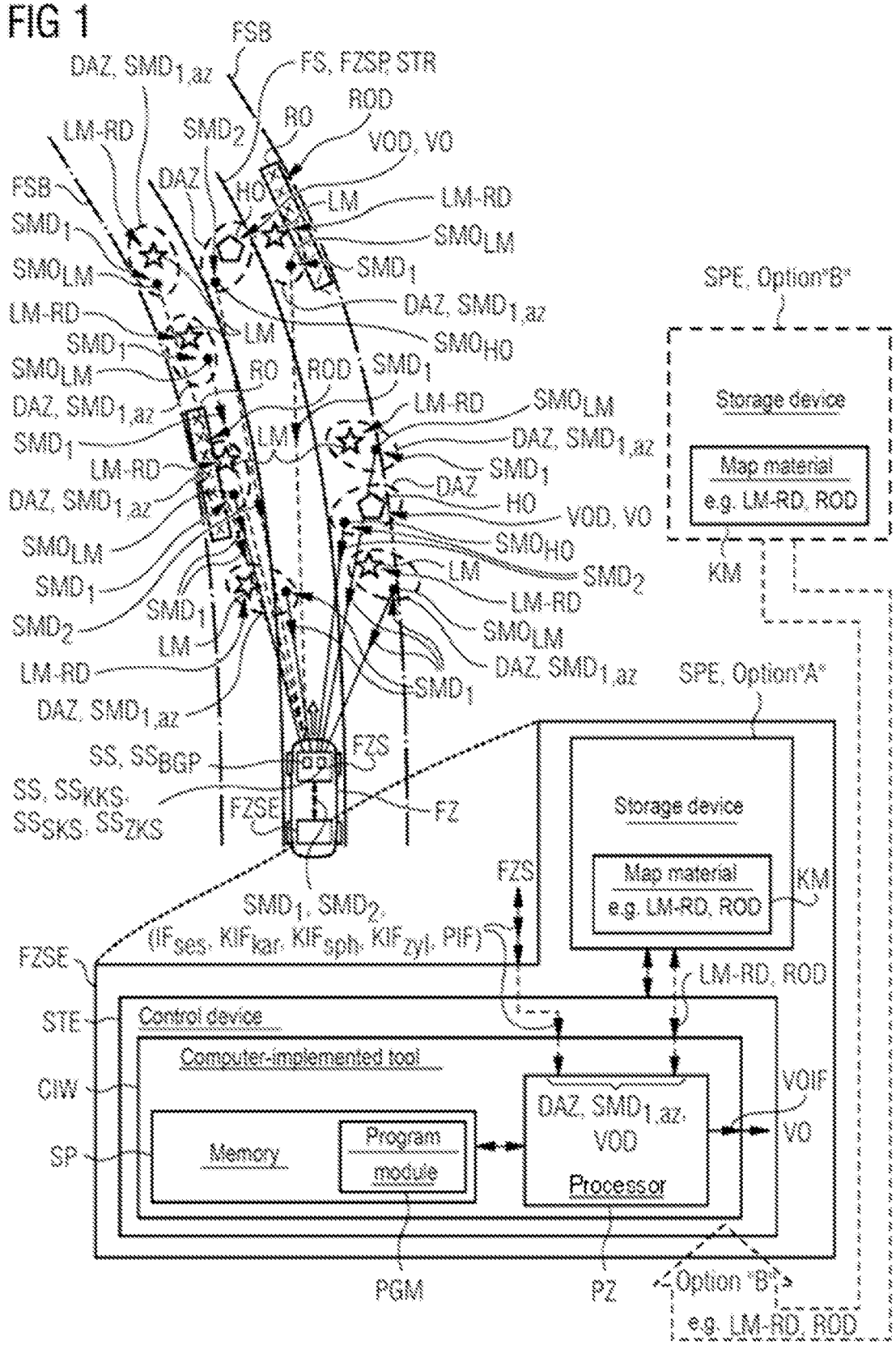

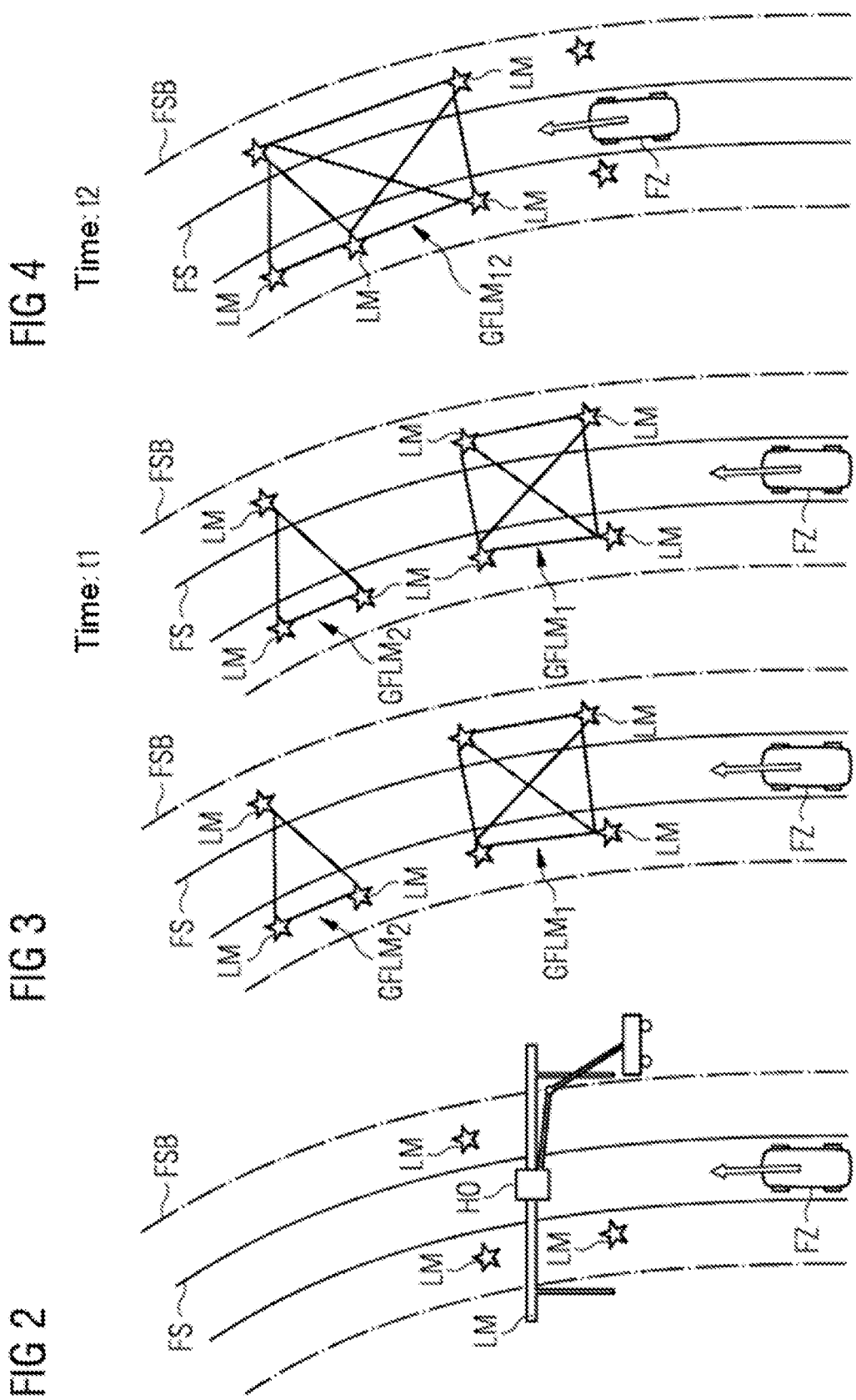

METHOD, COMPUTER-IMPLEMENTED TOOL, VEHICLE CONTROL UNIT, AND VEHICLE FOR LOCATING OBSTACLES IN VEHICLE ROADWAY REGIONS, WHICH ARE CHARACTERIZED BY LANDMARKS

CROSS-REFERENCE TO RELATED APPLICATIONS

This application claims priority to PCT Application No. PCT/EP2021/069758, having a filing date of Jul. 15, 2021, which claims priority to DE Application No. 10 2020 210 059.4, having a filing date of Aug. 7, 2020, the entire contents both of which are hereby incorporated by reference.

FIELD OF TECHNOLOGY

The following relates to a method for locating obstructing objects in vehicle roadway regions characterized by landmarks, a computer-implemented tool for locating obstructing objects in vehicle roadway regions characterized by landmarks, a vehicle control unit for locating obstructing objects in vehicle roadway regions characterized by landmarks, and a vehicle for locating obstructing objects in vehicle roadway regions characterized by landmarks.

BACKGROUND

When guiding vehicles as a mobile means of transport for transporting people, goods, tools or machines—independently of whether the guidance is assisted, partially automated, highly automated, fully automated or autonomous (this is then called "autonomous driving" overall)—a fundamental function of such autonomous vehicles is that of avoiding collisions with obstructing objects.

Such vehicles move on land (as terrestrial vehicles), on water (as watercraft) and/or in the air (as aircraft). For embodiments of the present invention, however, only those vehicles of the type defined above which move or are moved relative to roadways characterized by landmarks are considered.

A landmark is a topographical object, usually visible from a distance, for spatial orientation and terrestrial navigation, which may optionally be marked on maps by special map symbols. Due to the recording in the map, a landmark is thus a specific feature or topological object in the world, which can be detected by a vehicle so that an association between sensor-based detection and map can be established. The landmark can be a normally occurring object, for example a street light post, it can be a specially positioned object, for example reflective markers and/or "QR <Quick Response>" codes, or it can also be a re-recognizable pattern arising from the detection, for example "Scale Invariant Feature Transform <SIFT>" features, cf. https://en.wikipedia.org/wiki/Scale-invariant_feature_transform.

For collision avoidance, sensor-based capture of an obstructing object is necessary and the captured obstructing object has to be associated with a critical region. The critical region generally comprises a road lane or a roadway of the vehicle itself and possibly a region surrounding the road lane or the roadway. The critical region results from a combination of map material, ego-localization or self-localization, and planned roadway or route. In order to take all of this into account, embodiments of the present invention also discusses a road lane or roadway region in relation to collision avoidance and the sensor-based capture of the obstructing objects.

The association with, or localization of the obstructing object to, a critical region is disrupted by various factors of influence, however. By way of example these are:
faulty extrinsic sensor calibration,
faulty ego-localization (self-localization),
faulty map material,
swaying on the track for rail vehicles,
low horizontal and vertical angular resolution of the sensors, which is relevant in particular at long range.

This problem becomes more and more serious with large distances, because even small errors, in particular angle errors, in the above-mentioned points can lead to large deviations in the estimated positions of the obstructing object. This is relevant in particular for vehicles that move at high speed.

This problem has been addressed until now mainly by minimizing the above-mentioned factors of influence in the association with, or localization of the obstructing object to, the critical region.

In addition, a probabilistic fusion of data from multiple sensors is a way of reducing position inaccuracies. Thereby drawbacks of some sensors can be compensated by advantages of other sensors.

An obstructing object is typically and in the known manner associated with or localized to a critical region in three steps:

1. The vehicle localizes itself. A variety of information can be used in this regard, e.g. GPS "Global Positioning System <GPS>" information, sensor information (e.g. radar <Radio Detection and Ranging>, lidar <Light Detection and Ranging>, camera) and/or also landmark information from the map material.

2. Conversion of sensor-detected obstructing objects into global coordinates by using the coordinate transformation of the vehicle into global coordinates that arise from the localization.

3. Association of the detected obstructing objects with the critical region.

In this obstructing object localization known according to the conventional art, for example NVIDIA-Drive (cf. https://developer.nvidia.com/drive/drive-perception), where a neural network, e.g. DriveNet, Deconvolutional Neural Network (DNN), is used for the obstructing object detection and a neural network independent thereof is used for the road lane and landmark detection, e.g. MapNet, Deconvolutional Neural Network (DNN), the landmarks are used for localization in step 2.

SUMMARY

An aspect relates to that of specifying a method, a computer-implemented tool, a vehicle control unit and a vehicle for locating obstructing objects in vehicle roadway regions which are characterized by landmarks, without having to localize the obstructing objects precisely in the known manner or having to use a coordinate transformation necessary for that purpose.

The idea on which embodiments of the invention are based, is that, in order to locate obstructing objects in vehicle roadway regions characterized by landmarks, an obstructing object in a vehicle roadway region characterized by landmarks is located or the position thereof determined on a roadway of the roadway region where it constitutes an obstacle for the vehicle by (i) associating sensor measurement data, which is captured by sensors of a vehicle sensor system and belongs to sensor measurement objects by means of which a landmark and the obstructing object can be represented, with stored landmark reference data, stored in particular in the form of map material, and (ii) ascertaining a sensor-capture-specific locating distance between a sensor measurement object having unassociated sensor measurement data and a landmark having associated sensor measurement data on the basis of the associated and unassociated sensor measurement data, by putting sensor-capture-specific information items contained in said sensor measurement data relating to the locating distances to be ascertained into a relationship with one another, if the sensor measurement object having the unassociated sensor measurement data can be correlated with the roadway, either on the basis of the ascertained sensor-capture-specific locating distance or on the basis of the ascertained sensor-capture-specific locating distance with the addition of the landmark reference data and/or stored reference object data, stored in particular in the form of map material, which represents at least one reference object of the vehicle roadway region having a defined constant distance from the vehicle roadway region, in addition to the at least one landmark. Otherwise, if the at least one non-associable sensor measurement object cannot be correlated with the roadway, the at least one obstructing object is located beyond, i.e. outside of, the roadway in the roadway region, where it does not constitute an obstacle for a vehicle.

It is important to emphasize that in the teaching according to embodiments of the invention it is not intended to determine the localization of the vehicle in relation to the roadway region with the aid of landmarks, but rather to determine the position of a potentially dangerous obstructing object by using the sensors of the vehicle sensor system, with the assistance of landmark information, by establishing relations between known landmarks and detected obstructing objects in relation to the vehicle roadway in the roadway region as the critical region.

The important difference of embodiments of the present invention from the conventional art indicated in the introduction to the description is the simultaneous consideration of landmarks and obstacles in steps 2 and 3, i.e. the landmarks are not used only for localization, but also thereafter for association with the critical region. This step of association is not discernible in the conventional art indicated, where there is a strict separation.

A further important difference from the conventional art is that the teaching according to embodiments of the invention does not primarily pursue the objective of localizing the obstructing object that is not associable with the roadway region very precisely and absolutely with respect to the vehicle, but rather that of assessing the risk of whether this obstructing object, due to the position thereof in a critical region such as the roadway, constitutes a potential obstacle for the vehicle or not.

In the teaching according to embodiments of the invention, an enhanced robustness in relation to obstructing object localization and association with critical regions is achieved by the improved and closer relationship between map, vehicle, obstructing objects and critical regions. Thereby the number of false positive detections is also reduced, which in turn increases the overall system reliability.

Due to the utilization of known landmarks, and potentially landmark information as well, obstructing objects can be associated with regions, without having to individually precisely localize the obstructing objects. The landmarks serve as anchors which can sharply reduce the uncertainty in the object detection and localization problem.

The teaching according to embodiments of the invention can be used versatilely, for example in application cases involving autonomous vehicles. However, there is also application potential in intelligent transportation technology and "automated guided vehicles <AGVs>".

BRIEF DESCRIPTION

Some of the embodiments will be described in detail, with reference to the following figures, wherein like designations denote like members, wherein:

FIG. 1 shows a vehicle scenario for locating obstructing objects in a roadway region characterized by landmarks;

FIG. 2 shows a modified vehicle scenario for locating obstructing objects in a roadway region characterized by landmarks, which has an obstructing object extending perpendicular to a roadway of the roadway region;

FIG. 3 shows a modified vehicle scenario for locating obstructing objects in a roadway region which is characterized by landmarks and has a roadway in which the landmarks are arranged in a grouping or a formation; and FIG. 4 shows a further vehicle scenario for locating obstructing objects on the basis of the scenario according to FIG. 3 with a capture of landmarks in the roadway region at different locating times.

DETAILED DESCRIPTION

FIG. 1 shows a vehicle scenario for locating obstructing objects HO in a roadway region FSB characterized by landmarks. In the illustrated case, the roadway region FSB comprises a roadway FS for a vehicle FZ, which as a terrestrial vehicle, for example designed as a passenger car <Pkw>, is traveling in the direction of an arrow drawn at the vehicle FZ in a vehicle lane FZSP of a road STR.

The roadway region FSB additionally includes (a) at least one landmark LM having the definition set forth above in the introduction to the description, which is arranged alongside the roadway FS and is also suitable for utilizing modeled situational relationships in the roadway region, (b) in addition to the at least one landmark LM, at least one reference object RO having a defined constant distance from the roadway FS of the vehicle roadway region FSB, which reference object can be, for example, a noise protection wall LSW (2-dimensional feature of the roadway region) along the road STR, and (c) at least one obstructing object HO which is arranged along the roadway FS and/or on the roadway FS and constitutes a danger to the vehicle FZ if it is situated on the roadway FS.

Further reference objects can be already existing features in the surroundings of the roadway region FSB or also deliberately positioned features. The following can be mentioned as examples:
- streetlights (1-dimensional features)
- fences (2-dimensional features)
- buildings, bridges (3-dimensional features)
- special markers, which are sensor-specific in certain circumstances, such as reflectors for lidar and radar, or defined patterns for cameras,
- features arising automatically from the algorithms, e.g., SIFT features.

For locating the obstructing objects HO in the roadway region FSB having the at least one landmark LM and the at least one reference object RO, the vehicle FZ contains a vehicle sensor system FZS having at least one sensor SS, and also contains a vehicle control unit FZSE, which are interconnected for sensor control and sensor data transmission.

To increase the robustness and reduce the uncertainty when locating the obstructing object, the vehicle sensor system FZS according to the representation in FIG. 1 contains two sensors SS of different modalities with regard to the locating of the obstructing objects according to embodiments of the invention, as described in more detail below. Thus the vehicle sensor system FZS contains a sensor SS, which is based on a Cartesian coordinate system $SS_{KKS}$, a spherical coordinate system $SS_{SKS}$ or a cylindrical coordinate system $SS_{ZKS}$, and a further sensor SS, which is based on an imaging principle $SS_{BGP}$.

A radar sensor based on a "Radio Detection and Ranging <Radar>" principle, or a lidar sensor based on a "Light Detection and Ranging <Lidar>" principle, is used as the sensor SS based on the Cartesian coordinate system $SS_{KKS}$, the spherical coordinate system $SS_{SKS}$ or the cylindrical coordinate system $SS_{ZKS}$, while a camera sensor is used as the sensor SS based on an imaging principle $SS_{BGP}$.

The increase in the robustness and the reduction in the uncertainty when locating obstructing objects can alternatively also be achieved by using two sensors SS of the same modality but different angles of view.

For locating the obstructing object, the vehicle control unit FZ SE in the vehicle FZ contains—according to an option "A" shown in FIG. 1—a storage device SPE for storing (i) landmark reference data LM-RD, which represents the at least one landmark LM and is stored in the storage device SPE in the form of map material KM for example, and (ii) reference object data ROD, which represents the at least one reference object RO and is again also stored in the form of map material KM for example in the storage device SPE, and a control device STE that is connected to the storage device SPE.

A computer-implemented tool CIW, designed as a computer program product (non-transitory computer readable storage medium having instructions, which when executed by a processor, perform actions) and referred to as application software <APP>, can then be uploaded into this control device STE in order to carry out the locating of obstructing objects in the vehicle control unit FZSE. For locating obstructing objects by being uploaded into the control device STE, the computer-implemented tool CIW has a nonvolatile readable memory SP in which processor-readable control program commands of a program module PGM for locating obstructing objects are stored, and a processor PZ that is connected to the memory SP and executes the control program commands of the program module PGM for locating obstructing objects.

Alternatively to the design of the vehicle control unit FZ SE in the vehicle FZ according to option "A" shown in FIG. 1, it is also possible—according to an option "B" shown in FIG. 1—that, for locating obstructing objects in the vehicle control unit FZSE, the storage device SPE in which the landmark reference data LM-RD and the reference object data ROD are stored is not contained in the vehicle control unit FZSE, but is instead located outside the vehicle control unit FZSE, and is implemented as cloud storage for example (dash-line representation of the storage device SPE in FIG. 1). Thus the vehicle control unit FZSE according to option "B" contains only the control device STE, which is associated in this state with the external storage device SPE for data access, however. This association is shown in FIG. 1 by the double arrow in dash-lines from the storage device SPE to the control device STE having the computer-implemented tool CIW, which has now also been uploaded in order to perform the locating of obstructing objects in the vehicle control unit FZSE.

Before explaining in detail below the performance of the obstructing object locating in the vehicle FZ using the vehicle sensor system FZS and the vehicle control unit FZSE, and specifically both in the vehicle control unit FZ SE and with the uploaded computer-implemented tool CIW, it should be noted at this point, with reference to the explanations above in the introduction to the description, that the vehicle FZ can be any vehicle on land, on the water, and in the air as long as the vehicle region FZB is characterized by a travel path for the vehicle in question, by landmarks and possibly by additional reference objects, as well as by obstructing objects that can be a danger to the vehicle that is moving on the travel path.

A further example of such a vehicle that could be mentioned is a rail vehicle, for instance a train with a traction vehicle. In this example, the vehicle region is a rail vehicle region that is characterized by a track section for the rail vehicle and likewise by landmarks of the type defined in the introduction to the description, by reference objects such as overhead line masts and again by obstructing objects.

Further reference objects in this case can again also be already existing features in the surroundings of the track region or also deliberately positioned features. The following can be mentioned as examples:
signaling installations (1-dimensional features)
fences, noise protection walls (2-dimensional features)
buildings, bridges, buffers (3-dimensional features)
special markers, which are sensor-specific in certain circumstances, such as reflectors for lidar and radar, or defined patterns for cameras,
features arising automatically from the algorithms, e.g. SIFT features.

The performance of the obstructing object locating in the vehicle FZ by using the vehicle sensor system FZS and the vehicle control unit FZ SE begins with the capture in the vehicle FZ, by the at least one sensor SS of the vehicle sensor system FZS, of primary sensor measurement data $SMD_1$ and secondary sensor measurement data $SMD_2$ from the roadway region FSB having the at least one landmark LM and the at least one obstructing object HO. The primary sensor measurement data $SMD_1$ belongs here to at least one sensor measurement object $SMO_{LM}$, by which one of the at least one landmark LM could be represented in each case, while the secondary sensor measurement data $SMD_2$ belongs here to at least one sensor measurement object $SMO_{HO}$, by which one of the at least one obstructing object HO could be represented in each case.

This capture is dependent on the sensor and is distance-dependent independently of whether the vehicle FZ is moving or stationary. For the scenario shown in FIG. 1, this means that the capturing of the primary sensor measurement data $SMD_1$ and the secondary sensor measurement data $SMD_2$ is dynamic and, in multiple time steps and at different locating times, at least partially differing primary sensor measurement data $SMD_1$ and secondary sensor measurement data $SMD_2$ is captured. This situation is expressed schematically in FIG. 1 by showing the capture of the respective sensor measurement data with solid connecting lines between the sensor measurement objects and the vehicle sensor system on the one hand and with connecting lines in dashes between the sensor measurement objects and the vehicle sensor system on the other.

Subsequently, after beginning to perform the obstructing object locating, the processor PZ, executing the control program commands of the program module PGM for locating obstructing objects, of the computer-implemented tool CIW, after said tool has been uploaded into the control device STE, i.e. implemented in the control device STE, accesses the primary sensor measurement data $SMD_1$ and the secondary sensor measurement data $SMD_2$ captured by the at least one sensor SS of the vehicle sensor system FZS by reading in this data or uploading it from the vehicle sensor system FZS, for example.

The same thing happens with the landmark reference data LM-RD stored in the storage device SPE, for example stored in the form of the map material KM, which the processor PZ accesses by reading in this data from the storage device SPE in accordance with option "A" for example, or by uploading the data from the storage device SPE in accordance with option "B".

In relation to the map material KM, it is additionally possible that the map material KM that contains the landmark reference data LM-RD can be evaluated and verified in advance even while operation is ongoing, i.e. landmarks, regions and landmark patterns that frequently lead to erroneous associations can be declared to be uncertain information, or artificial measures such as installing additional markers can be taken in the surroundings of the roadway region FSB. This is done by a human observer or alternatively by an automated assessment of the observation frequency in conjunction with a parameterizable threshold.

However, the locating of obstructing objects can be carried out even if the computer-implemented tool CIW is not present in the control device STE (e.g. by uploading) or the control device STE in the vehicle control unit FZSE, into which the computer-implemented tool CIW has been uploaded, has not been implemented in the vehicle FZ. In these cases the above-mentioned data $SMD_1$, $SMD_2$, LM-RD is input into the processor PZ.

If the above-mentioned data $SMD_1$, $SMD_2$, LM-RD is now in the processor PZ, independently of where the computer-implemented tool CIW and in addition the vehicle control unit FZSE are located, then the processor PZ and the program module PGM for locating obstructing objects are designed such that the following steps for locating the obstructing object are carried out:

1. The primary sensor measurement data $SMD_1$ and the secondary sensor measurement data $SMD_2$ are associated DAZ for landmark association with the landmark reference data LM-RD representing the at least one landmark LM. The result of this association is as follows:

a. The data association DAZ between the primary sensor measurement data $SMD_1$ and the landmark reference data LM-RD has been accomplished and consequently, by means of associated primary sensor measurement data $SMDL_{1,az}$, a landmark association for the at least one sensor measurement object $SMO_{LM}$ is possible, whereby the respective landmark LM is represented by the associated primary sensor measurement data $SMD_{1,az}$.

b. The data association DAZ between the secondary sensor measurement data $SMD_2$ and the landmark reference data LM-RD has not been accomplished and consequently a landmark association for the at least one sensor measurement object $SMO_{HO}$ is impossible.

The processor PZ and the program module PGM are designed for locating obstructing objects in such a way that the data association DAZ for landmark association is carried out with the aid of probabilistic factor graph methods or association/optimization methods.

The probabilistic factor graph methods are based on the implementation of software libraries such as "Georgia Tech Smoothing and Mapping <GTSAM>" or "<g2o> as a General Framework for Graph Optimization", whereas the association/optimization methods are based on methods, for example, "Global Nearest Neighbor <GNN>", Munkres algorithms, "Joint Probabilistic Data Association <JPDA>" or "Multi-Hypothesis-Tracking <MHT>".

In the probabilistic factor graph methods, the association is not done in only one step, but is instead filtered over multiple time steps. The processor PZ and the program module PGM are designed appropriately for this. This avoids erroneous associations leading to large errors.

The association/optimization methods are alternative methods for data association, but a poorer performance can be expected.

In the above-mentioned methods for data association, some of the sensor measurement objects are associated with landmarks, some with dynamic sensor measurement objects from previous time steps, and some cannot be associated. These non-associated sensor measurement objects are relevant for the subsequent steps.

2. Sensor-capture-specific locating distances VOD between the at least one non-associable sensor measurement object $SMO_{HO}$ and the at least one landmark LM represented by the respective associated primary sensor measurement data $SMD_{1,az}$ are ascertained on the basis of the associated primary sensor measurement data $SMD_{1,az}$ and the secondary sensor measurement data $SMD_2$ by putting sensor-capture-specific information items $IF_{ses}$ contained in the associated primary sensor measurement data $SMD_{1,az}$ and in the secondary sensor measurement data $SMD_2$ relating to the locating distances VOD to be ascertained into a relationship with one another.

Putting the sensor-capture-specific information $IF_{ses}$ with one another relative to the locating distances VOD to be ascertained, in order to ascertain the locating distances VOD sensor-specifically, depends on the type of measurement data capture of the at least one sensor SS of the vehicle sensor system FZS.

If, for example, the at least one sensor SS is based on the Cartesian coordinate system $SS_{KKS}$, the spherical coordinate system $SS_{SKS}$ or the cylindrical coordinate system $SS_{ZKS}$ and if therefore the radar sensor based on the "Radio Detection and Ranging <Radar>" principle or the lidar sensor based on the "Light Detection and Ranging <Lidar>" principle is used, then Cartesian coordinate information $KIF_{kar}$, spherical coordinate information $KIF_{sph}$ or cylindrical coordinate information $KIF_{zyl}$ in the associated primary sensor measurement data $SMD_{1,az}$ and in the secondary sensor measurement data $SMD_2$ is placed in relation to the locating distances VOD to be ascertained by determining an angle difference or a Euclidean distance between one another in order to ascertain the locating distances VOD between the at least one non-associable sensor measurement object $SMO_{HO}$ and the at least one landmark LM represented by the respective associated primary sensor measurement data $SMD_{1,az}$.

On the other hand, if the at least one sensor SS is based on the imaging principle $SS_{BGP}$ and therefore the camera sensor is used for example, then pixel information items PIF in the associated primary sensor measurement data $SMD_{1,az}$ and in the secondary sensor measurement data $SMD_2$ relating to the locating distances VOD to be ascertained are put into a relationship with one another by determining pixel distances, in order to ascertain the locating distances VOD between the at least one non-associable sensor measurement object $SMO_{HO}$ and the at least one landmark LM represented by the respective associated primary sensor measurement data $SMD_{1,az}$.

3. The at least one obstructing object HO is located VO on the roadway FS in the roadway region FSB, where it constitutes an obstacle for a vehicle FZ, and locating information VOIF is generated or produced if, either on the basis of the ascertained sensor-capture-specific locating distances VOD, or on the basis of the ascertained sensor-capture-specific locating distances VOD with the addition of the landmark reference data LM-RD and/or the reference object data ROD, the at least one non-associable sensor measurement object $SMO_{HO}$ can be associated with the roadway FS. Otherwise, if the at least one non-associable sensor measurement object $SMO_{HO}$ cannot be associated with the roadway FS, but can be associated with the roadway region FSB, it does not constitute an obstacle for the vehicle FZ. It is nevertheless located, specifically in the roadway region FSB outside the roadway of the vehicle FZ. Both cases are shown in FIG. 1 by way of example.

The generated locating information VOIF can be used, for example, to automatically initiate control measures in the vehicle FZ in response to the located obstructing object, for example a reduction in the speed and braking of the vehicle if necessary, or to inform the vehicle driver of the located obstructing object with a warning for example.

The reference object data ROD, stored in the storage device SPE, e.g. stored there as map material KM, is again accessed by the processor PZ, as for the landmark reference data LM-RD, by reading this data from the storage device SPE according to option "A" for example, or by uploading it from the storage device SPE according to option "B".

Furthermore, the processor PZ and the program module PGM are designed for locating obstructing objects in such a way that the locating VO of the at least one obstructing object HO, and optionally the generation or production of the locating information by means of the sensor measurement data capture, the data association and the locating distance ascertainment are performed dynamically at different locating times, at least in relation to the sensor data capture and the data association, for purposes of object tracking.

The robustness and meaningfulness of the locating is increased in particular by tracking the locating distance over time. Alternatively, the sensor measurement objects can be tracked and then the locating distance determined.

With sufficiently accurate ascertainment of the locating distance, the non-associable obstructing object HO located on the roadway FS in FIG. 1 is detected to the right of the two left-hand two landmarks HO and to the left of the right-hand landmark HO. By means of the known relative distance of the landmarks LM with respect to the roadway FS alone, it is possible to determine that the non-associated obstructing object HO is an obstacle. The terms "to the left of" and "to the right of" can be resolved by angle or pixel differences. If said obstructing object HO were to the right of the right-hand landmark LM, it would clearly not constitute an obstacle, as is the case with the other non-associable obstructing object HO shown in FIG. 1.

FIG. 2 shows a modified vehicle scenario for locating obstructing objects in a roadway region characterized by landmarks LM, which has an obstructing object HO extending perpendicular to the a roadway FS of the roadway region FSB. The obstructing object HO extending perpendicular to the roadway FS is a maintenance vehicle on the roadway FS and it has to be determined whether the roadway FS has vertical clearance to allow traveling. A known landmark LM, in the form of a bridge for example, for which it is known that it is possible to drive underneath it, has been recognized, and it is possible to determine by means of ascertained locating distances, obtained for example from pixel distances or angular distances, whether the maintenance vehicle is higher or lower than the obstructing object HO extending perpendicular to the roadway FS of the roadway region FSB and thus pertains, in its vertical extent, to a region that is critical for the vehicle FZ. Thereby it can be determined that it is possible to drive over or under the obstructing object HO.

FIG. 3 shows a modified vehicle scenario for locating obstructing objects in a roadway region FSB that is characterized by landmarks LM and has a roadway FS in which the landmarks LM are arranged in a grouping or a formation $GFLM_1$, $GFLM_2$. The robustness of the locating of obstructing objects is increased by considering the grouping and formation of the landmarks $GFLM_1$, $GFLM_2$, rather than the landmarks LM individually.

The landmark reference data LM-RD contains data that represents the grouping or formation of the landmarks $GFLM_1$, $GFLM_2$ for a group-based or formation-based landmark association and supplements the stored map material KM.

The grouping and formation of the landmarks $GFLM_1$, $GFLM_2$ also simplifies the data association between the primary sensor measurement data $SMD_1$ and the secondary sensor measurement data $SMD_2$, respectively, and the landmark reference data LM-RD. The landmark groupings or landmark formations have been previously statically selected in the map material and fixed so that, for locating obstructing objects, it is only necessary to perform the data association of sensor measurement data with the landmark groupings or landmark formations. In this case, captured sensor measurement objects are checked as to whether they satisfy the properties of one of the known landmark groupings or landmark formations, which markedly simplifies the landmark association.

When selecting the groupings or formations, it is possible to choose landmark groupings or landmark formations that have uniqueness features that differ sufficiently strongly from others (at least in the roadway region and the surroundings thereof). This is comparable to point marker formations in field of 3D tracking on the basis of multiple cameras.

FIG. 4 shows a further vehicle scenario for locating obstructing objects on the basis of the scenario according to FIG. 3 with a capture of landmarks in the roadway region at different locating times t1, t2. The vehicle scenario for locating obstructing objects can be expanded by learning the landmark groupings or landmark formations $GFLM_1$, $GFLM_2$ in the course of a dynamic locating of obstructing objects at the different locating times t1, t2, i.e. during operation, by adding a further landmark grouping or landmark formation $GFLM_{12}$, which originated at locating time t2, to the landmark groupings or landmark formations $GFLM_1$, $GFLM_2$ known at locating time t1 from FIG. 3.

The landmark reference data LM-RD contains further data, which represents the further landmark grouping or landmark formation $GFLM_{12}$ for a group-based or formation-based landmark association and additionally supplements the stored map material KM.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for locating obstructing objects in vehicle roadway regions characterized by landmarks, in which
   a) primary sensor measurement data, detectable by at least one sensor of a vehicle sensor system, from a roadway region having at least one landmark and at least one obstructing object is used, the primary sensor measurement data belonging to at least one sensor measurement object that can represent one of the at least one landmark, and secondary sensor measurement data is used, belonging to at least one sensor measurement object that can represent one of the at least one obstructing object,
   b) stored landmark reference data, representing the at least one landmark is used, characterized by
   c) associating the primary sensor measurement data and the secondary sensor measurement data with the landmark reference data representing the at least one landmark for landmark association, wherein
      the data association between the primary sensor measurement data and the landmark reference data has been accomplished and consequently, by associated primary sensor measurement data, a landmark association for the at least one sensor measurement object is possible and therefore the respective landmark is represented by the associated primary sensor measurement data,
      the data association between the secondary sensor measurement data and the landmark reference data has not been accomplished and consequently a landmark association for the at least one sensor measurement object is impossible and the secondary sensor measurement data represents at least one non-associable sensor measurement object,
   d) ascertaining sensor-capture-specific locating distances between the at least one non-associable sensor measurement object and the at least one landmark represented by the respective associated primary sensor measurement data on the basis of the associated primary sensor measurement data and the secondary sensor measurement data by putting sensor-capture-specific information items contained in the associated primary sensor measurement data and in the secondary sensor measurement data relating to the ascertained sensor-capture-specific locating distances to be ascertained into a relationship with one another,
   e) locating the at least one obstructing object on a roadway in the roadway region, where the at least one obstructing object constitutes an obstacle for a vehicle, if the at least one non-associable sensor measurement object can be associated with the roadway, either on the basis of the ascertained sensor-capture-specific locating distances, or on the basis of the ascertained sensor-capture-specific locating distances with the addition of the landmark reference data and/or stored reference object data, which represents at least one reference object, of the vehicle roadway region, in addition to the at least one landmark, having a defined, constant distance from a roadway of the vehicle roadway region, and otherwise, if the at least one non-associable sensor measurement object cannot be associated with the roadway, then the at least one obstructing object is located outside of the roadway in the roadway region, where the at least one obstructing object does not constitute the obstacle for the vehicle.

2. The method according to claim 1, wherein
the locating of the at least one obstructing object with the sensor measurement data capture, the data association and the locating distance ascertainment is performed dynamically at different locating times, at least in relation to the sensor data capture and the data association, for purposes of object tracking.

3. The method according to claim 1, wherein
the landmark reference data contains data that represents a grouping or formation of landmarks for a group-based or formation-based landmark association.

4. The method according to claim 1, wherein
if a type of measurement data capture of the at least one sensor of the vehicle sensor system is based on a Cartesian coordinate system, a spherical coordinate system or a cylindrical coordinate system, the sensor-capture-specific information of the associated primary sensor measurement data and secondary sensor measurement data is Cartesian coordinate information, spherical coordinate information or cylindrical coordinate information, with which the locating distances are ascertained by angle difference determination or by determining a Euclidean distance.

5. The method according to claim 1, wherein
if a type of measurement data capture of the at least one sensor of the at least one vehicle sensor system is based on an imaging principle, the sensor-capture-specific information of the associated primary sensor measurement data and secondary sensor measurement data is pixel information, with which the locating distances are ascertained by determining pixel distances.

6. The method according to claim 1, wherein
the data association for landmark association is performed with the aid of probabilistic factor graph methods.

7. The method according to claim 6, wherein
the landmark association is filtered with the aid of probabilistic factor graph methods over multiple time steps.

8. The method according to claim 1, wherein the stored landmark reference data and/or stored reference object data are stored in a form of a map material.

9. The method according to claim 1, wherein the at least one reference object is a noise protection wall on a road or an overhead line mast on a railroad track.

10. The method according to claim 1, wherein the at least one sensor is used as a radar sensor, a lidar sensor, and/or a camera sensor.

11. A computer-implemented tool for locating obstructing objects in vehicle roadway regions characterized by landmarks, comprising a nonvolatile readable memory in which processor-readable control program commands are stored, and a processor that is connected to the memory and executes the control program commands, in which
   a) primary sensor measurement data, detectable by at least one sensor of a vehicle sensor system, from a roadway region having at least one landmark and at least one obstructing object, the primary sensor measurement data belonging to at least one sensor measurement object that can represent one of the at least one landmark, and secondary sensor measurement data, belonging to at least one sensor measurement object that can represent one of the at least one obstructing object, is input into the processor,
   b) stored landmark reference data, which represents the at least one landmark, is input into the processor, wherein
   c) the processor is configured in such a way that
   c1) the primary sensor measurement data and the secondary sensor measurement data are associated with the landmark reference data representing the at least one landmark for landmark association, wherein the data association between the primary sensor measurement data and the landmark reference data has been accomplished and consequently, by means of associated primary sensor measurement data, a landmark association for the at least one sensor measurement object is possible and therefore the respective landmark is represented by the associated primary sensor measurement data, the data association between the secondary sensor measurement data and the landmark reference data has not been accomplished and consequently a landmark association for the at least one sensor measurement object is impossible and the secondary sensor measurement data represents at least one non-associable sensor measurement object, d) sensor-capture-specific locating distances between the at least one non-associable sensor measurement object $SMO_{HO}$ and the at least one landmark represented by the respective associated primary sensor measurement data are ascertained on the basis of the associated primary sensor measurement data and the secondary sensor measurement data by putting sensor-capture-specific information items contained in the associated primary sensor measurement data and in the secondary sensor measurement data relating to the ascertained sensor-capture-specific locating distances to be ascertained in a relationship with one another, e) the at least one obstructing object is located on a roadway in the roadway region, where the at least one obstructing object constitutes an obstacle for a vehicle, if the at least one non-associable sensor measurement object can be associated with the roadway, either on the basis of the ascertained sensor-capture-specific locating distances, or on the basis of the ascertained sensor-capture-specific locating distances with the addition of the landmark reference data and/or stored reference object data, which represents at least one reference object, of the vehicle roadway region, in addition to the at least one landmark, having a defined, constant distance from a roadway of the roadway region, and otherwise, if the at least one non-associable sensor measurement object cannot be associated with the roadway, the at least one obstructing object is located outside of the roadway in the roadway region, where the at least one obstructing object does not constitute the obstacle for the vehicle.

12. The computer-implemented tool according to claim 11, wherein
the processor is configured in such a way that the locating of the at least one obstructing object with the sensor measurement data capture, the data association and the locating distance ascertainment is performed dynamically at different locating times, at least in relation to the sensor data capture and the data association, for the purposes of object tracking.

13. The computer-implemented tool according to claim 11, wherein
the landmark reference data contains data that represents a grouping or formation of landmarks for a group-based or formation-based landmark association.

14. The computer-implemented tool according to claim 11, wherein if a type of measurement data capture of the at least one sensor of the vehicle sensor system is based on a Cartesian coordinate system, a spherical coordinate system or a cylindrical coordinate system, the sensor-capture-specific information of the associated primary sensor measurement data and secondary sensor measurement data is Cartesian coordinate information, spherical coordinate information or cylindrical coordinate information, with which the locating distances are ascertained by angle difference determination or by determining a Euclidean distance.

15. The computer-implemented tool according to claim 11, wherein if a type of measurement data capture of the at least one sensor of the vehicle sensor system is based on an imaging principle, the sensor-capture-specific information of the associated primary sensor measurement data and secondary sensor measurement data is pixel information, with which the locating distances are ascertained by determining pixel distances.

16. The computer-implemented tool according to claim 11, wherein the processor is configured such that the data association for landmark association is performed with the aid of probabilistic factor graph methods.

17. The computer-implemented tool according to claim 16, wherein the processor is configured such that the landmark association is filtered with the aid of probabilistic factor graph methods over multiple time steps.

18. The computer implemented tool according to claim 11, wherein the primary sensor measurement data, the secondary sensor measurement data, and/or the landmark reference data are read in by the processor or uploaded into the processor.

19. The computer implemented tool according to claim 11, wherein the landmark reference data and/or stored reference object data are stored in a form of a map material.

20. The computer implemented tool according to claim 11, wherein the at least one reference object is a noise protection wall on a road or an overhead line mast on a railroad track.

21. The computer implemented tool according to claim 11, wherein the at least one sensor is used as a radar sensor, a lidar sensor, and/or a camera sensor.

22. A vehicle control unit for locating obstructing objects in vehicle roadway regions characterized by landmarks, wherein a storage device for storing
a) primary sensor measurement data, detectable by at least one sensor of a vehicle sensor system, from a roadway region having at least one landmark and at least one obstructing object, the primary sensor measurement data belonging to at least one sensor measurement object that can represent one of the at least one landmark, and secondary sensor measurement data belonging to at least one sensor measurement object that can represent one of the at least one obstructing object, and
b) landmark reference data representing the at least one landmark, is either connected to a control device in the vehicle control unit (option A) or is associated with the control device in the vehicle control unit (option B),
characterized by
a computer-implemented tool according to claim 11 that can be uploaded into the control device.

23. A vehicle for locating obstacles in vehicle roadway regions characterized by landmarks, comprising a vehicle sensor system in which at least one sensor is contained, and wherein primary sensor measurement data, belonging to at least one sensor measurement object that can represent a respective at least one landmark, and secondary sensor measurement data belonging to at least one sensor measurement object that can represent a respective at least one obstructing object, is captured with the at least one sensor from a roadway region having at least one landmark and at least one obstructing object, and comprising the vehicle control unit as claimed in claim 22 that is connected to the vehicle sensor system.

\* \* \* \* \*